United States Patent [19]

Schaefer

[11] Patent Number: 5,791,456

[45] Date of Patent: *Aug. 11, 1998

[54] SWITCH ASSEMBLY AND MOUNTING BRACKET THEREFOR

[75] Inventor: Roger E. Schaefer, St. Louis, Mo.

[73] Assignee: Emerson Electric Co., St. Louis, Mo.

[*] Notice: The term of this patent shall not extend beyond the expiration date of Pat. No. 5,636,731.

[21] Appl. No.: 823,374

[22] Filed: Mar. 24, 1997

Related U.S. Application Data

[63] Continuation of Ser. No. 431,304, Apr. 28, 1995, Pat. No. 5,636,731.

[51] Int. Cl.⁶ .................................................. H01H 1/64
[52] U.S. Cl. ............................. 200/293; 200/295; 200/294
[58] Field of Search ............................. 200/293, 295, 200/297, 333, 294, 47; 310/68 A, 68 R, 89, 71; 174/50.54, 50.51, 52.1, 52.3, 61, 62, 63, 656, 50, 48

[56] References Cited

U.S. PATENT DOCUMENTS

| | | |
|---|---|---|
| 1,569,864 | 1/1926 | Leppert . |
| 3,412,225 | 11/1968 | Rogers et al. . |
| 3,866,868 | 2/1975 | Fish et al. . |
| 4,295,018 | 10/1981 | Borrelli . |

*Primary Examiner*—David J. Walozak

*Attorney, Agent, or Firm*—Howell & Haferkamp, L.C.

[57] ABSTRACT

A switch assembly (10) for installation on a dynamoelectric machine (M). An electrical overload switch (12) is interconnected with the dynamnoelectric machine and electrical conduits (C) are routed thereto for resetting the dynamoelectric machine after it is shut down due to an overload condition. A conduit box (14) has opposed sidewalls (16, 18) and endwalls (20, 22), and an open top and bottom. A bracket (30) on which the switch is mounted is sized to fit in the box for a switch element (32) of the switch to be positioned adjacent an opening (34) in one wall of the box. Dimples (44a, 44b) are formed in the wall against which the bracket is installed. The dimples extend inwardly into the interior of the box and act as stops for the bracket for properly positioning the bracket and switch within the box. A plurality of knockouts (K1–K6) are formed in the sidewalls for providing an opening through which electrical conduits are routed to the switch when a knockout is removed. Mounting flanges (24, 26) are formed on opposite sides of the box for mounting the box to a cover (60) of the dynamoelectric machine. The cover has a top (62) sized to fit over the interior of the box. The top has a peripheral depending sidewall (64) covering an upper portion of respective sidewalls and endwalls of the box. Dimples (66a–66c) are formed in a section of the cover sidewall and extend inwardly. The box has corresponding dimples (70a–70c) formed therein into which the dimples in the cover sidewall fit for mounting the cover onto the box.

21 Claims, 4 Drawing Sheets

SWITCH ASSEMBLY AND MOUNTING BRACKET THEREFOR

This is a continuation of application Ser. No. 08/431,304 filed Apr. 28, 1995, now U.S. Pat. No. 5,636,731.

BACKGROUND OF THE INVENTION

This invention relates to switch assemblies for use with large dynamoelectric machines including electric motors and generators having a control switch such as an overload reset switch mounted on the motor shell or endshield of the machine, and more particularly, to an improved, lower cost assembly.

It is not uncommon to mount larger dynamoelectric machines such as higher fractional horsepower or multi-horsepower motors or generators to a floor or other fixture at a using site. For this purpose, a bracket is attached to the motor with the bracket then being mounted to the floor or fixture. It is also not uncommon for the motor or generator to have an associated switch mounted to its outer shell or endshield. The switch is typically an overload protector type switch which interrupts power flow to the machine when an overload condition occurs. The switch is then either manually reset when the overload condition has been corrected; or, in some systems, the switch can be automatically reset. Electrical conduit for conveying power to the machine is routed from a central, power distribution network to a conduit box or enclosure in which the switch is also mounted. When electrically connected, the switch is interposed in the circuit path for powering the machine.

Previously, the switch was attached to a mounting bracket which was then riveted or welded to inside walls of the conduit box. FIG. 9–12 show a prior art conduit box 80 having a mounting bracket 82 welded in a permanently fixed position in its interior. The conduit box 80 is comprised of opposite endwalls 84, 86 and opposite sidewalls 88, 90. The opposite sidewalls 88, 90 of the box are provided each with one or more knockout openings 92. One of the endwalls 86 may also be provided with a knockout opening 94. A pair of flanges 96, 98 are provided on the opposed sidewalls 86, 88 for attachment of the conduit box to the exterior housing of a motor by threaded fasteners (not shown). A switch opening 100 is provided in one of the box endwalls 84 to allow a switch element mounted in the box interior by the bracket 82 to project therethrough.

As best seen in FIG. 10, the mounting bracket 82 has a central portion 102 and opposed side portions 104, 106 at opposite ends of the center portion. The side portions 104, 106 are resilient and are spaced apart by a distance that enables a switch (not shown) to be press fit and held therebetween. A center opening 108 is provided in the bracket center portion 102 to enable a switch element to project through the center opening 108 and the switch opening 100 when the bracket, mounted in a fixed position in the box interior, holds the switch in the box interior. Additional, smaller holes, 110, 112 are also provided in the bracket center portion 102. These holes are provided to enable the bracket center portion 102 to be mounted against the interior surface of the box endwall 84 either by rivets, welding or other equivalent methods of permanently fixing the mounting bracket 82 to the conduit box endwall 84.

The conduit box 80 and mounting bracket 82 of the prior art are constructed as a single part with the mounting bracket 82 secured to the interior surface of the conduit box endwall 84 with the bracket center opening 108 coinciding with the endwall switch opening 100. The mounting bracket 82 is permanently affixed to the interior surface of the conduit box endwall 84 either by welding, by rivets or by another equivalent method. This installation thus required a secondary manufacturing step which added cost to the machine assembly and its installation. Further, were the switch to fail, replacement of the switch required the replacement of the conduit box with the associated disconnection and reconnection of the conduits. This imposed an additional cost to the maintenance of the system in which the machine is used. Finally, there were a number of different sized conduit boxes which were used with different machines. By standardizing the size of a switch mounting bracket, it would be possible to reduce the number of boxes required and therefore reduce inventory costs.

SUMMARY OF THE INVENTION

Among the several objects of the present invention may be noted the provision of a switch assembly for an overload protection switch or the like used with a dynamoelectric machine such as an electric motor or generator; the provision of such an assembly comprising a conduit box mounted to a shell or endshield of the motor or generator; the provision of such a conduit box in which the overload switch is mounted in a bracket which is readily fitted in place within the conduit box and does not require welding or riveting for installation; the provision of such a conduit box having a cover which snap-fits in place to enclose the switch within the box and to facilitate access to the switch for service or replacement; the provision of such a bracket on which the overload switch is mounted, the bracket readily fitting within the conduit box and snap fitting in place to properly position the switch for electrical connection to the motor or generator; the provision of such a conduit box having inwardly projecting dimples at opposed ends of the box, the dimples acting as stops for the bracket when the bracket is inserted into the conduit box to properly position the bracket and locate a reset element of the switch at a desired opening in the box, and the bracket and switch being insertable into either end of the box; the provision of such a conduit box top also having inwardly extending dimples which are received in corresponding dimples or openings formed about the upper rim of the box to simplify installation of the top; the provision of such a conduit box and bracket which are readily and inexpensively formed with no secondary manufacturing operations involved thereby to lower the cost of the box; and, the provision of such a conduit box and bracket which are usable with a variety of motors and generators, with a minimum number of sizes being required thereby to minimize inventory costs.

In accordance with the invention, generally stated, a switch assembly is for installation on a dynamoelectric machine. An electrical overload switch is interconnected with the dynamoelectric machine and electrical conduits are routed thereto for resetting the dynamoelectric machine after it is shut down due to an overload condition. A conduit box has opposed sidewalls and endwalls, and an open top and bottom. A bracket on which the switch is mounted is sized to fit in the box for a switch element of the switch to be positioned adjacent an opening in one wall of the box. Dimples are formed in the wall against which the bracket is installed. The dimples extend inwardly into the interior of the box. The dimples act as stops for the bracket when it is fitted into the box to properly position the bracket and locate a reset element of the switch at the opening. A plurality of knockouts are formed in the sidewalls for providing an opening through which electrical conduits are routed to the switch when a knockout is removed. Mounting flanges are formed on opposite sides of the box for mounting the box to a cover of the dynamoelectric machine. A cover has a top sized to fit over the exterior of the box. The top has a peripheral depending sidewall covering an upper portion of respective sidewalls and endwalls of the box. Dimples are formed in a section of the cover sidewall and extend inwardly. The box has corresponding dimples formed therein into which the dimples in the cover sidewall fit, for mounting the cover onto the box. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
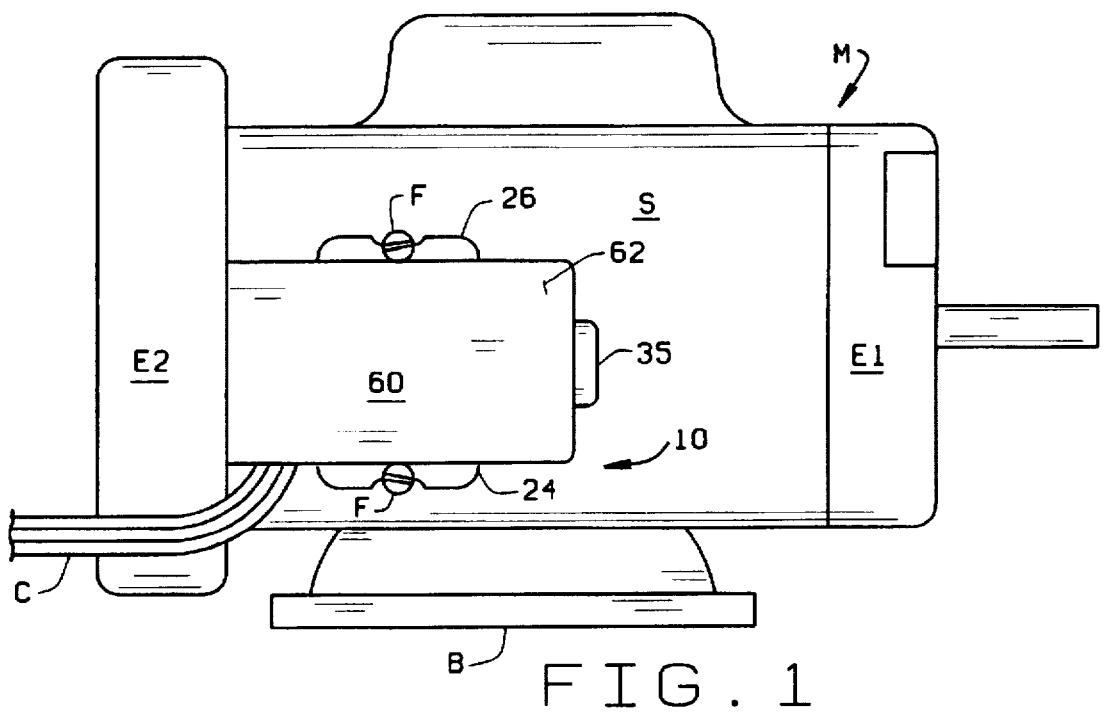
FIG. 1 is an elevational view of a dynamoelectric machine with a switch assembly of the present invention in place.

Referring to FIG. 1, a dynamoelectric machine such as an electric motor or generator is designated generally M. The machine has a shell S covering the central portion of the machine, and respective endshields E1, E2 enclosing the ends of the machine. The machine may be attached to a bracket B by which the motor or generator is mounted in an appropriate location. An electrical switch assembly of the present invention is indicated generally 10 and is interconnected with the dynamoelectric machine; and, in particular, with electrical conduits C by which power from a source (not shown) is routed to the machine. As shown in FIG. 1, the switch assembly is mounted on shell S of the machine; although, it will be understood that the assembly could also be mounted on one of the endshields as well. The switch assembly includes an overload reset switch 12 (see FIG. 3) for resetting the dynamoelectric machine after it is shut down due to an overload condition.

Figure 2:
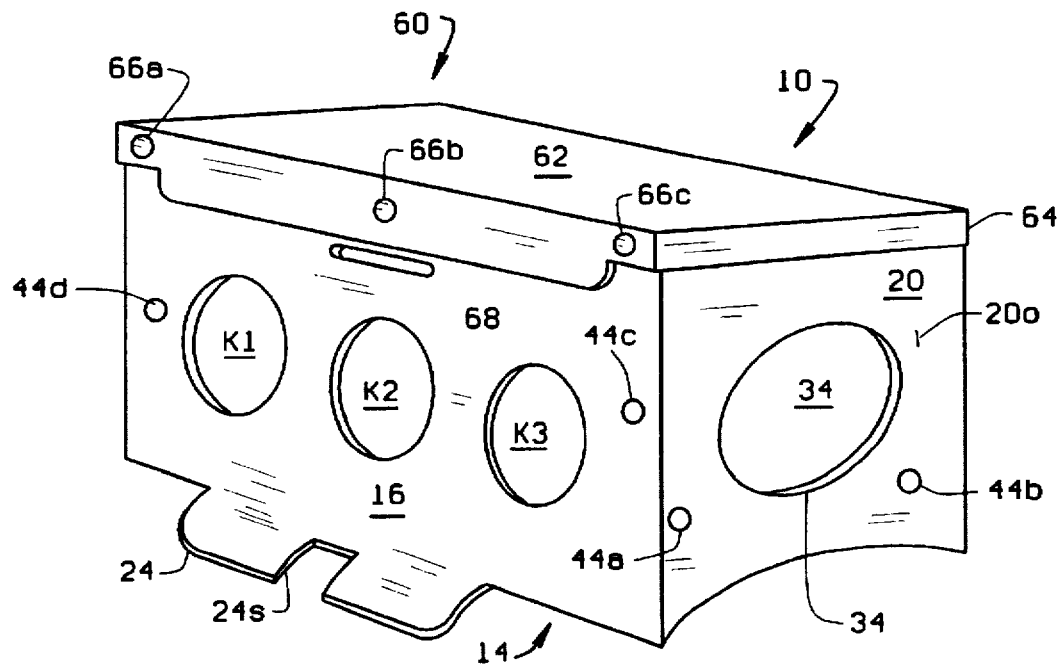
FIG. 2 is a perspective of the assembly with its cover installed.
Figure 7:
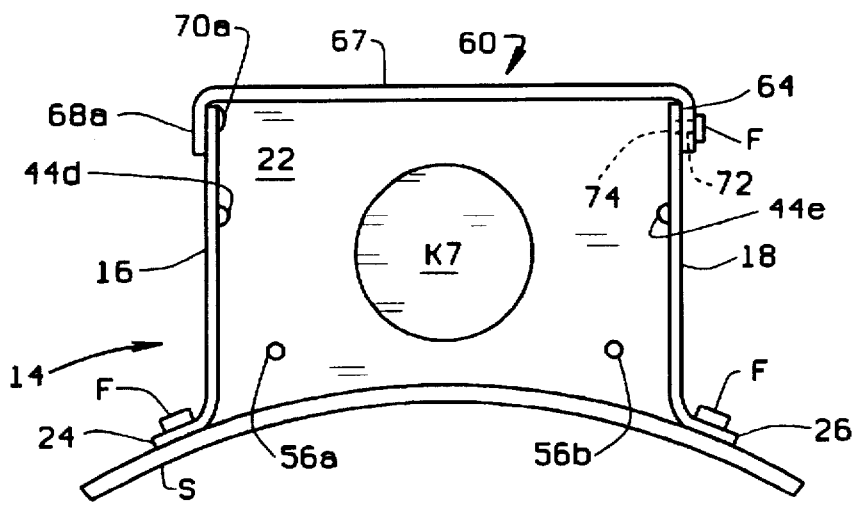
FIG. 7 is sectional view of the conduit box and its cover as installed on the dynamoelectric machine as taken along line 7—7 in FIG. 3; and, FIG. 8 is a plan view of the underside of the conduit box cover.
Figure 9:
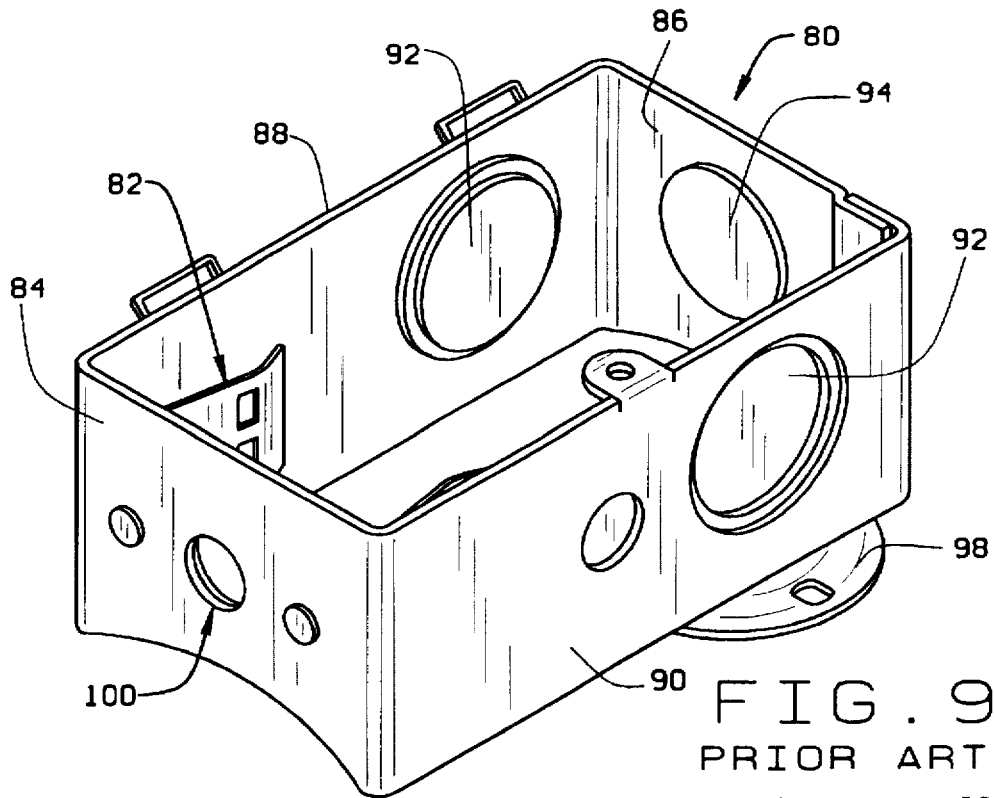
FIGS. 9–12 are views showing the construction of a prior art conduit box.
Figure 10:
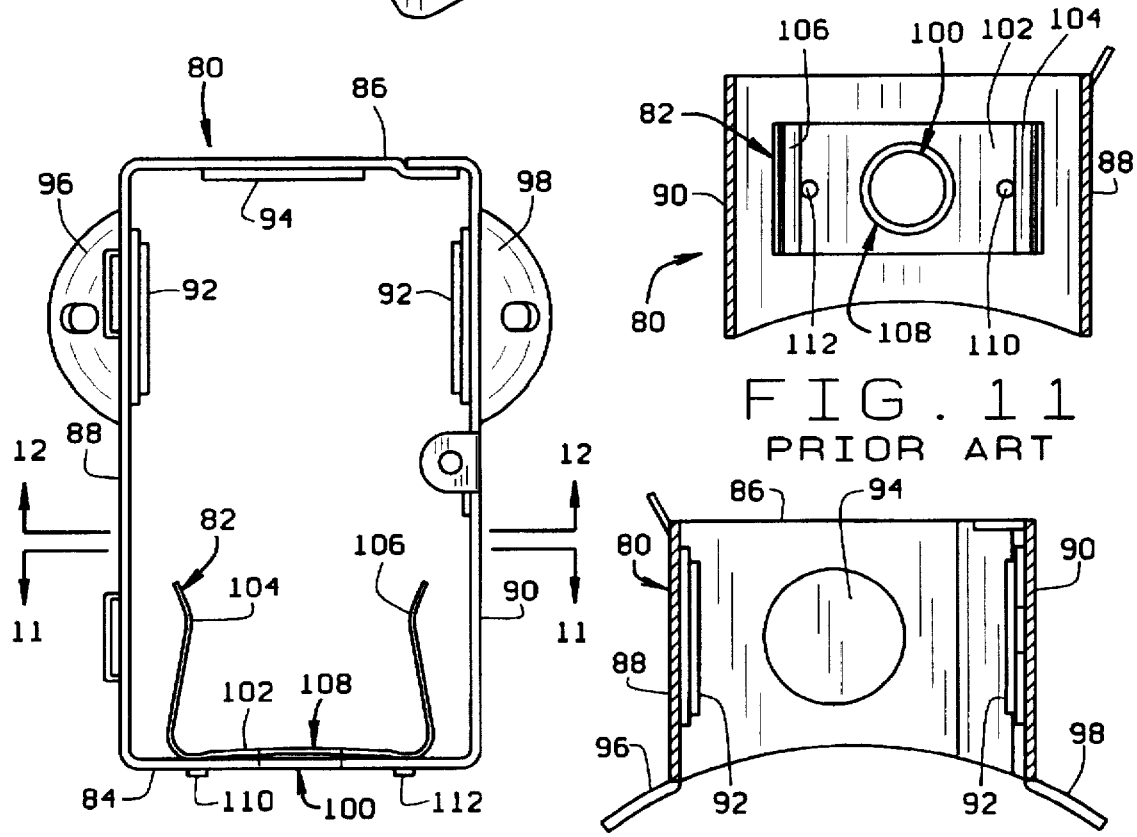
Figure 11:
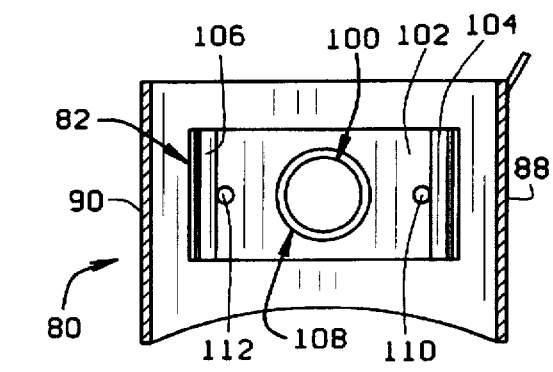
Figure 12:
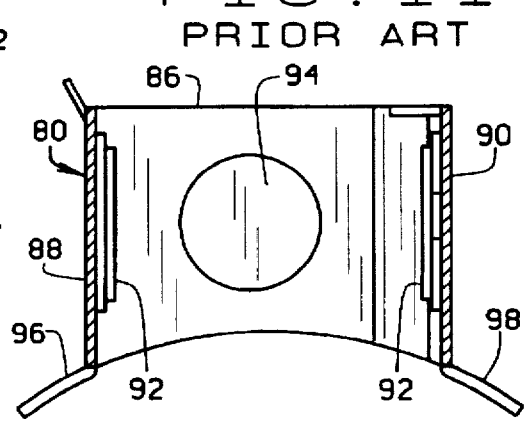

Assembly 10 includes a conduit box 14 which has opposed sidewalls 16, 18, and endwalls 20, 22. The top and bottom of the box are open. As shown in FIGS. 2 and 7, the base of the respective endwalls are curved to fit the curvature of the machine shell. In addition, respective mounting flanges 24, 26 are formed on opposite sides of the box for mounting the box to shell S. The flanges are similarly curved, as they extend outwardly from the outer sidewalls of the conduit box, to also fit the curvature of the machine shell. Each flange also includes an inwardly extending slot 24s, 26s for fasteners F such as screws or bolts by which the switch assembly is mounted in place.

Figure 3:
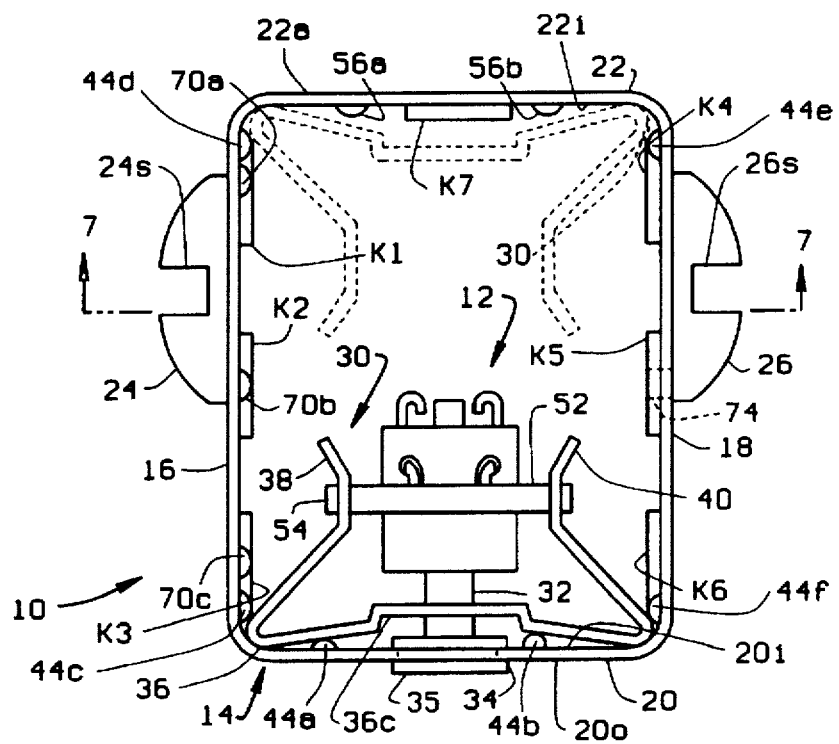
FIG. 3 is a top plan view of a conduit box of the assembly with its cover removed.
Figure 4:
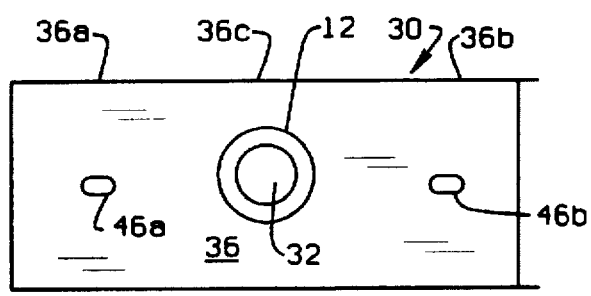
FIG. 4 is front elevational view of a switch mounting bracket installed in the conduit box.

Overload switch 12 is installed on a bracket 30 which is sized to fit in box 14. When so installed, a switch element 32 of the switch is positioned adjacent an opening 34 in endwall 20 of the box. A grommet 35 is installed in opening 34 and covers the outer end of the switch element. The grommet provides a water tight cover for the switch. And, the grommet is made of a flexible material by which the switch element is movable by pushing on the grommet to actuate switch 12. Bracket 30 includes a front section 36 and opposed side sections 38, 40. Front section 36 of the bracket has a width corresponding to that of endwall 20, on the inside of the endwall. Section 36 further has a recessed center portion 36c with a central opening 42 therein through which switch element 32 of the switch protrudes when the switch is mounted on the bracket. The section further has outer portions 36a, 36b flanking the center portion. The outer face of these outer portions generally abut the inner face 20i of endwall 20. As shown in FIG. 2, a pair of dimples 44a, 44b are formed in outer face 20o of endwall 20. These are inwardly extending dimples as shown in FIG. 3. Sections 36a, 36b of bracket 30 have openings 46a, 46b respectively formed therein. If the bracket were to be installed in the conduit box using rivets, the rivets would be used with these openings. However, in accordance with the present invention, when the bracket is inserted in the conduit box, by insertion through the open top of the box, the dimples act as stops against which the bottom of front section 36 bear. The opposite sidewalls 16, 18 of the conduit box are also provided with pairs of dimples. A pair of dimples 44c, 44d are provided in one sidewall 16, and a pair of dimples 44e, 44f are provided in the opposite sidewall. These sidewall dimples are formed as inwardly extending dimples just as the dimples 44a, 44b in the box endwall 20 and are best seen in FIGS. 2 and 3. As best seen in FIG. 3, the dimples 44c, 44f formed in each of the sidewalls 16, 18, respectively, are positioned adjacent the interior surface 20i of the box endwall 20. These dimples 44c, 44f are positioned sufficiently close to the endwall interior surface 20i to engage behind the opposed side sections 38, 40 of the bracket when the bracket is positioned against the endwall interior surface 20i, thus retaining the bracket in its desired location without the bracket having to be welded or riveted to the box or held to the box by a fastener. In a like manner, each of the dimples 44d, 44e is positioned on its respective sidewalls 16, 18 sufficiently close to the endwall interior surface 22i at the opposite end of the box interior to engage behind the opposed side sections 38, 40 of the bracket when the bracket is positioned against the endwall interior surface 22i, thus retaining the bracket and the switch in the desired location without the bracket having to be welded or riveted to the box or held to the box by a fastener. This not only properly orients the bracket and switch in place, but retains the bracket and switch in the desired location without the bracket having to be welded or riveted to the box. This saves both manufacturing and installation costs.

Figure 5:
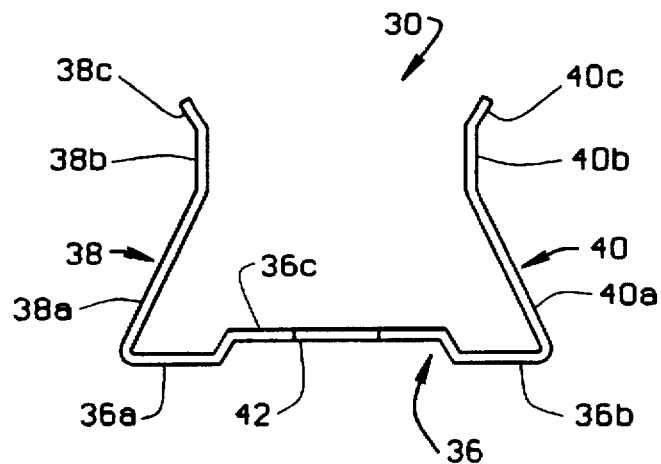
FIG. 5 is a top plan view of the bracket without the switch installed.

As best shown in FIGS. 3 and 5, side sections 38, 40 of the bracket each extend inwardly from front section 36. Each side section has a first and inwardly extending portion 38a, 40a, an intermediate portion 38b, 40b, which extend perpendicular to front section 36 of the bracket, and an outwardly flaring rear portion 38c, 40c. Outer portions 36a, 36b of the bracket front section 36 engage with the side walls 16, 18 together with inwardly extending portions 38a, 40a of the bracket side sections 38, 40 where the portions of the front section merge with the side sections, thereby providing the sole mechanism necessary to secure the bracket in the box. Portions 38b, 40b, each have a pair of openings 50a, 50b.

Figure 6:
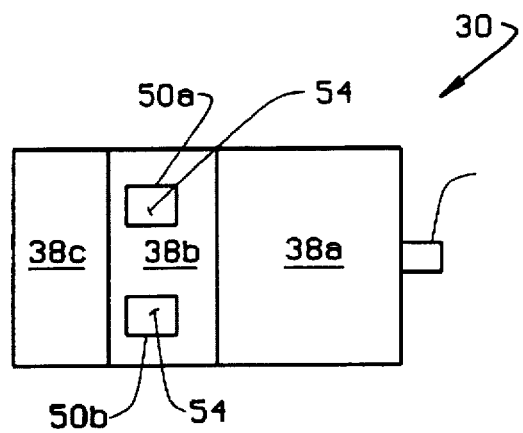
FIG. 6 is a side elevational view of the bracket.

The openings are of the same size and are arranged vertically as shown in FIG. 6. Switch 12 has a circumferential collar 52 with a pair of tabs 54 on opposite sides of the switch body. The respective pairs of tabs are received in the respective sets of openings 50a, 50b to mount the switch to the bracket.

A plurality of knockouts K1–K6 are formed in the sidewalls of box 14 to provide an opening in the box through which electrical conduits C are routed to switch 12 when an appropriate knockout is removed. Knockouts K1–K3 are formed in sidewall 16, and knockouts K4–K6 in sidewall 18. Opening 34 in endwall 20 is also initially formed by a knockout. A corresponding knockout K7 is formed in opposite endwall 22. Dimples 56a, 56b corresponding to dimples 44a, 44b are formed in this endwall. It can be seen in FIG. 3, by comparing the relative positions of the dimples 44a, 44b and the knockout removed from the opening 34 in the one endwall 20, to the positions of the dimples 56a, 56b and the knockout K7 in the opposite endwall 22, that the two endwalls are mirror images of each other. This construction allows the bracket and switch to be located at either end of the conduit box depending upon the particular installation.

Figure 8:
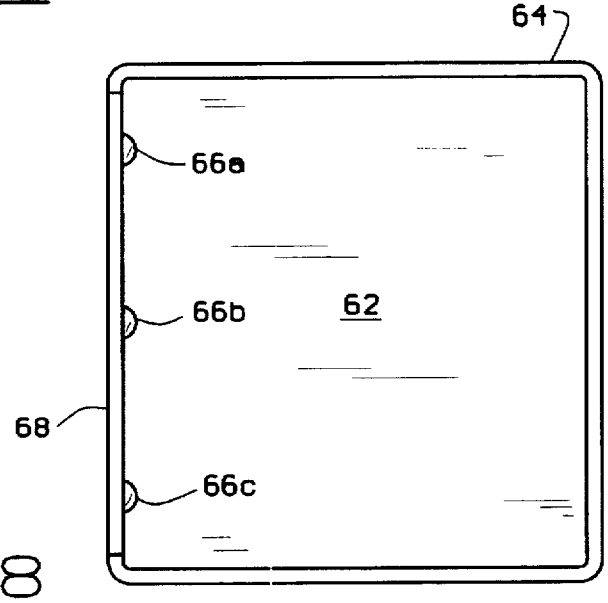

A cover 60 for the conduit box includes a top 62 sized to fit over the exterior of the box. The top has a peripheral depending sidewall 64 covering an upper portion of the respective sidewalls and endwalls of the box. Dimples 66a–66c are formed in a section 68 of the cover sidewall and extend inwardly as shown in FIG. 8. The box has corresponding dimples 70a–70c formed therein. The dimples in the cover sidewall fit into the dimples in the sidewall for mounting the cover onto the box. A hole 72 is formed in the portion of cover sidewall 64 opposite from the dimples. A corresponding opening 74 is formed in sidewall 18. Another fastener F is inserted through these openings, when the cover is in place, to fasten the cover to the box. Alternatively, dimples similar to dimples 66a–66c can be formed along this side of the cover, and dimples similar to dimples 70a–70c in sidewall 18, to help attach the cover to the box.

What has been described is a switch assembly for an overload protection switch or the like used with a dynamoelectric machine such as an electric motor or generator. The assembly includes a conduit box mounted to a shell or endshield of the motor or generator and is for installing an overload switch adjacent the motor or generator. This switch mounts on a bracket which is readily fitted in place within the conduit box. Welding or riveting are not required for installation. A cover for the box snap-fits in place to enclose the switch within the box. This facilitates access to the switch for service or replacement. A bracket on which the overload switch is mounted readily fits within the conduit box and snap fits in place to position the switch within the box for electrical connection to the motor or generator. The conduit box has inwardly projecting dimples formed at opposed ends of the box. The dimples act as stops for the bracket when it is inserted through the open top of the conduit box. This properly locates a reset element of the switch with respect to an opening in an endwall of the conduit box. The bracket and switch are insertable into either end of the box. The conduit box top also has dimples which fit into corresponding dimples or openings formed about the upper rim of the box. This simplifies installation of the top. The conduit box and bracket are readily and inexpensively formed without having to perform secondary manufacturing operations. This lowers the cost of the assembly. The conduit box and bracket are usable with a variety of motors and generators in a variety of installations.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. An apparatus for removably mounting a switch in an enclosure, the apparatus comprising:

a box having a pair of opposed sidewalls and a pair of opposed endwalls, the box having an opening to an interior of the box bounded by the pairs of sidewalls and endwalls, at least one of the endwalls having an opening therethrough and an interior surface facing the box interior;

a bracket that is separate from the box, the bracket having a front section and a pair of opposed side sections at opposite ends of the front section, the opposed side sections are spaced apart by a distance that is predetermined to enable a switch to be press fit between the opposed side sections and held therebetween, and the bracket front section is dimensioned to enable the bracket to be press fit through the box opening into the box interior between the box sidewalls and with the front section engaging the one endwall interior surface, thereby providing a removable mounting for a switch in the box interior.

2. The apparatus of claim 1, wherein:

at least one stop is provided on the one endwall interior surface in a position to engage the bracket front section as the bracket is press fit into the box interior and thereby limit the extent to which the bracket may be press fit into the box interior.

3. The apparatus of claim 2, wherein:

the one endwall has an exterior surface opposite its interior surface, and at least one inwardly extending dimple is provided in the exterior surface, the dimple being opposite to and forming the at least one stop in the endwall interior surface.

4. The apparatus of claim 3, wherein:

an inwardly extending dimple is formed in each sidewall adjacent the one endwall, the inwardly extending dimples in the sidewalls forming a pair of stops on the sidewalls in the box interior, and the stops are positioned relative to the endwall interior surface so that the opposed side sections of the bracket are positioned between the pair of sidewall stops and the endwall interior surface when the bracket is press fit into the box interior.

5. The apparatus of claim 2, wherein:

the at least one stop is positioned on the one endwall interior surface to position a switch held by the bracket side sections adjacent the one endwall opening when the bracket is press fit into the box interior and the front section engages the at least one stop.

6. The apparatus of claim 2, wherein:

the bracket front section has a central opening dimensioned to accommodate an element of a switch press fit and held between the bracket side sections, and the at least one stop is positioned on the one endwall interior surface to position the central opening adjacent the one endwall opening when the bracket is press fit into the box interior with the bracket front section engaging the at least one stop.

7. The apparatus of claim 1, wherein:

a second endwall of the pair of box endwalls opposes the one box endwall, the second endwall has an interior surface facing the box interior and the one endwall, and the bracket front section is dimensioned to enable the front section to be press fit through the box opening into the box interior between the box sidewalls and with the front section engaging the second endwall interior surface, thereby providing a removable mounting for a switch in the box interior against the one endwall or against the second endwall.

8. The apparatus of claim 1, wherein:

the endwall opening is covered by a knockout of the box.

9. The apparatus of claim 1, wherein:

the opposed sidewalls of the box have configurations that position portions of the opposed sidewalls where they will engage against the bracket when the bracket is press fit into the box interior with the bracket front section engaging the one endwall interior surface.

10. The apparatus of claim 9, wherein:

the bracket is held in the box interior with the bracket front section engaging the endwall interior surface solely by the portions of the opposed sidewalls engaging against the bracket when the bracket is press fit into the box interior.

11. An apparatus for removably mounting a switch in an enclosure, the apparatus comprising:

a bracket that is separate from the box, the bracket having a front section and a pair of opposed side sections at opposite ends of the front section, the opposed side sections are spaced apart by a distance that is predetermined to enable a switch to be press fit between the opposed side sections and held therebetween;

a box separate from the bracket, the box having a pair of opposed sidewalls and opposite first and second endwalls, each of the sidewalls and endwalls having interior surfaces that together surround an interior volume of the box, the interior volume is accessible through an opening of the box that is bounded by the sidewalls and endwalls, the endwalls of the box are dimensioned sufficiently large to enable the bracket to be inserted through the box opening and moved along one of the endwall interior surfaces to mount the bracket in the box interior volume with the bracket front section engaging the interior surface of the one endwall, and the interior surfaces of the endwalls are mirror images of each other enabling the bracket to be mounted in the box interior with the bracket front section engaging the interior surface of either the first endwall or the interior surface of the second endwall.

12. The apparatus of claim 11, wherein:

the bracket front section and side sections together have an exterior configuration that is complementary to an interior configuration of the interior surfaces of the first and second endwalls and portions of the sidewall interior surfaces that join with the endwall interior surfaces at corners of the box, enabling the bracket to be press fit into the box interior through the box opening and held in position in the box interior with the bracket front section against the interior surface of either the first or second endwall without fasteners.

13. The apparatus of claim 12, wherein:

the exterior configuration of the bracket front section and side sections and the interior configuration of the interior surfaces of the box first and second endwalls and the portions of the sidewall interior surfaces that join with the endwall interior surfaces enables the bracket to slide from its held position and out of the box interior.

14. The apparatus of claim 12, wherein:

the bracket is held in position in the box interior solely by the complementary configurations of the bracket exterior surface and the interior surfaces of the box endwalls and the portions of the box sidewalls.

15. The apparatus of claim 11, wherein:

the first and second endwalls have openings that are covered by knockouts.

16. The apparatus of claim 11, wherein:

the interior surface of each endwall has at least one stop positioned on the interior surface to engage the bracket front section when the bracket is inserted through the box opening and moved along one of the endwall interior surfaces and thereby limit the extent to which the bracket may be moved along the one endwall interior surface.

17. The apparatus of claim 16, wherein:

the at least one stop is positioned on the interior surface of each endwall to locate a switch held by the bracket side sections adjacent the opening in the endwall along which the bracket is moved when the bracket is mounted in the box interior volume.

18. The apparatus of claim 11, wherein:

the opposed sidewalls of the box have configurations that position portions of the sidewall interior surface where they will engage against the bracket when the bracket is inserted into the box interior with the bracket front section engaging the interior surface of one of the endwalls.

19. The apparatus of claim 18, wherein:

the bracket is held in the box interior volume with the bracket front section engaging the interior surface of one of the endwalls solely by the portions of the opposed sidewalls engaging against the bracket when the bracket is mounted in the box interior volume.

20. The apparatus of claim 11, wherein:

pairs of inwardly extending dimples are formed in each sidewall with each dimple positioned adjacent an endwall, the inwardly extending dimples in each sidewall form pairs of stops on the interior surface of each sidewall opposite the dimples, and the sidewall stops are positioned relative to the endwall interior surfaces so that the opposed side sections of the bracket are positioned between sidewall stops and the interior surface of the one endwall when the bracket is mounted in the box interior volume.

21. An apparatus for supporting a switch in an enclosure, the apparatus comprising:

a box having a pair of opposed sidewalls and a pair of opposed endwalls, the box having an opening to an interior of the box bounded by the pairs of sidewalls and endwalls;

a bracket for supporting a switch, the bracket being separate from the box, the bracket having a front section and a pair of opposed side sections at opposite ends of the front section, and the bracket front section is dimensioned to enable the bracket to be press fit through the box opening into the box interior and held between the box sidewalls, and to be removed through the box opening from the box interior where it is held between the box sidewalls, thereby providing a removable support for a switch in the box interior.

* * * * *